United States Patent
Taniguchi et al.

(10) Patent No.: US 8,240,926 B2
(45) Date of Patent: Aug. 14, 2012

(54) FIXING STRUCTURE OF EXTERIOR MEMBER TO OPTICAL FIBER CABLE

(75) Inventors: Hirokazu Taniguchi, Amagasaki (JP);
Shigeru Sasaki, Amagasaki (JP);
Takeshi Satake, Amagasaki (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 378 days.

(21) Appl. No.: 12/504,200

(22) Filed: Jul. 16, 2009

(65) Prior Publication Data

US 2010/0014814 A1 Jan. 21, 2010

(30) Foreign Application Priority Data

Jul. 17, 2008 (JP) .................................. 2008-186361

(51) Int. Cl.
*G02B 6/36* (2006.01)
*G02B 6/02* (2006.01)

(52) U.S. Cl. ........................... 385/77; 385/123; 385/128

(58) Field of Classification Search ........................ None
See application file for complete search history.

(56) References Cited

U.S. PATENT DOCUMENTS

| | | | | |
|---|---|---|---|---|
| 5,886,294 A | * | 3/1999 | Scrimpshire et al. | 174/359 |
| 2006/0088263 A1 | * | 4/2006 | Tanaka et al. | 385/128 |

FOREIGN PATENT DOCUMENTS

| | | |
|---|---|---|
| JP | 53-035019 | 4/1978 |
| JP | 55-41885 | 3/1980 |
| JP | 62-025708 | 2/1987 |
| JP | 62-170906 | 7/1987 |
| JP | 63-063005 | 3/1988 |
| JP | 5-36406 | 5/1993 |
| JP | 2000-266953 | 9/2000 |
| JP | 2003-057493 | 2/2003 |
| JP | 2003-227976 | 8/2003 |
| JP | 2005-79177 | 3/2005 |
| JP | 2005-208025 | 8/2005 |
| JP | 2006-184794 | 7/2006 |

* cited by examiner

*Primary Examiner* — Tina Wong
(74) *Attorney, Agent, or Firm* — Wenderoth, Lind, Ponack, L.L.P.

(57) ABSTRACT

A fixing structure of an exterior member to an optical fiber cable includes an optical fiber cable having a coating layer formed on an outer circumference of a bare optical fiber, and the exterior member has a through-hole through which the optical fiber cable can be inserted. The exterior member of the optical fiber cable has a light shielding member to cover an outer circumference of the optical fiber cable, the light shielding member is fixed at a part where the exterior member is externally mounted, and an inner surface of the through-hole of the exterior member is bonded to the light shielding member.

16 Claims, 5 Drawing Sheets

FIXING STRUCTURE OF EXTERIOR MEMBER TO OPTICAL FIBER CABLE

TECHNICAL FIELD OF THE INVENTION

The present invention relates to a fixing structure of an optical fiber cable to an exterior member such as a connector and the like.

BACKGROUND OF THE INVENTION

Conventionally, optical fibers have been used for various applications such as communication and measurement and, for example, a fiber laser apparatus utilizing an optical fiber as a laser medium is present (JP-A-2005-79177). A fiber laser apparatus is provided with an optical fiber, and it optically amplifies a laser beam that enters from one end of an optical fiber by propagating the beam inside the optical fiber and emits the beam from the other end of the optical fiber. Since the apparatus can emit a high quality and high power laser beam, it has been used as a processing means for, for example, cutting, welding and the like.

As an optical fiber to be used for fiber laser apparatus and the like, an optical fiber cable wherein an outer circumference of a bare optical fiber is coated with a coating layer of resin and the like is generally used to protect cladding of a bare optical fiber and, further, a core from a pressure from the outside.

In addition, when an optical fiber is installed in various apparatuses and equipment such as fiber laser apparatus and the like, a connector is generally bonded to the end of an optical fiber cable to facilitate connection between optical fibers and connection to other parts by a manual step or by an operation using a simple tool. Furthermore, to facilitate wiring of an optical fiber in an apparatus or equipment, a constitution is often employed wherein an optical fiber cable is bonded to a holding member having a holding part through which an optical fiber cable is held by insertion, and the holding member is installed on an optical fiber fixing member (part, processed part) previously formed in the apparatus or equipment.

SUMMARY OF THE INVENTION

When an apparatus incorporating an optical fiber such as a fiber laser apparatus and the like is repeatedly operated, a bonding portion of an exterior member such as a connector or a holding member externally mounted on the optical fiber generates heat, which may cause problems such as uncoupling of a bond of the connector, holding member and the like from the optical fiber, degradation of the optical fiber, and degradation of the exterior member such as the connector, the holding member and the like.

The present invention has been made in view of such situation and aims to solve the problem by providing a fixing structure of an exterior member to an optical fiber cable, which suppresses heat generation at a bonding portion of an exterior member to an optical fiber cable.

In an attempt to solve the above-mentioned problem, the present inventors have studied the cause of heat generation at a bonding portion of an exterior member to an optical fiber cable, and found the following. That is, the light that entered an optical fiber at an angle within its numerical aperture (NA) is totally reflected at core/cladding interface and propagates only in the core. The light that entered at an angle above the numerical aperture permeates the core/cladding interface, and sometimes permeates through the cladding to the outside of a coating layer. The permeated light is absorbed by an adhesive that bonds the exterior member to the optical fiber cable and the exterior member itself to generate heat. They have further studied from the aspects of suppression of the light absorption and completed the present invention.

Accordingly, the present invention provides the following.
(1) A fixing structure of an exterior member to an optical fiber cable comprising an optical fiber cable having a resin coating layer formed on an outer circumference of a bare optical fiber, and the exterior member having a through-hole through which the optical fiber cable can be inserted, wherein the aforementioned exterior member of the aforementioned optical fiber cable has a light shielding member to cover an outer circumference of the optical fiber cable, the light shielding member is fixed at a part where the exterior member is externally mounted, and an inner surface of the through-hole of the aforementioned exterior member is bonded to the light shielding member.
(2) The fixing structure of the above-mentioned (1), wherein the light shielding member is a shielding layer formed on the resin coating layer of the optical fiber cable.
(3) The fixing structure of the above-mentioned (1), wherein the light shielding member is a light-shielding pipe, and a resin is filled between the light-shielding pipe and the optical fiber cable.
(4) The fixing structure of the above-mentioned (1), wherein the light shielding member is a light-shielding pipe, and a resin which is the same as the resin coating layer of the optical fiber cable is filled between the light-shielding pipe and the optical fiber cable.
(5) The fixing structure of the above-mentioned (1), wherein the bare optical fiber is a polymer cladding fiber, the light shielding member is a light-shielding pipe, and a resin which is the same as the resin coating layer of the optical fiber cable is filled between the light-shielding pipe and the optical fiber cable.
(6) The fixing structure of the above-mentioned (1), wherein the inner surface of the through-hole is bonded to the light shielding member with an adhesive layer.
(7) The fixing structure of the above-mentioned (1), wherein the inner surface of the through-hole is bonded to the light shielding member with an elastic member.
(8) The fixing structure of the above-mentioned (1), wherein the exterior member is a connector fixed on an end of the optical fiber cable.
(9) The fixing structure of the above-mentioned (1), wherein the optical fiber cable propagates a short wavelength light having a wavelength of 200-700 nm, and the light shielding member is made from a metal.
(10) The fixing structure of the above-mentioned (9), wherein the metal is one or more kinds selected from aluminum, gold, silver and platinum.

According to the present invention, a light shielding member to cover an outer circumference of an optical fiber cable is fixed to a part where an exterior member is provided on the optical fiber cable (a predetermined part in the direction of axis of the optical fiber cable), and the exterior member is bonded to the light shielding member. Therefore, the light leaking from the optical fiber cable is shielded or attenuated by the light shielding member, and the light absorption by the exterior member and a material (adhesive etc.) used for bonding the exterior member can be suppressed, thus suppressing heat generation therein, which prevents detachment of the exterior member, thermal degradation of the optical fiber and the like. In addition, since the light shielding member is elastically sandwiched between the optical fiber cable and the exterior member, even when the optical fiber cable is bent and the like, the light shielding member is not easily detached and its shading function is stably maintained. Consequently, degradation of the fiber and the exterior member due to repeated use of the optical fiber can be sufficiently reduced, and an inconvenience of uncoupling of the bond of the exterior member can be solved.

DETAILED DESCRIPTION OF THE INVENTION

The present invention is explained in the following by referring to a preferable embodiment thereof.

Figures 1A, 1B:
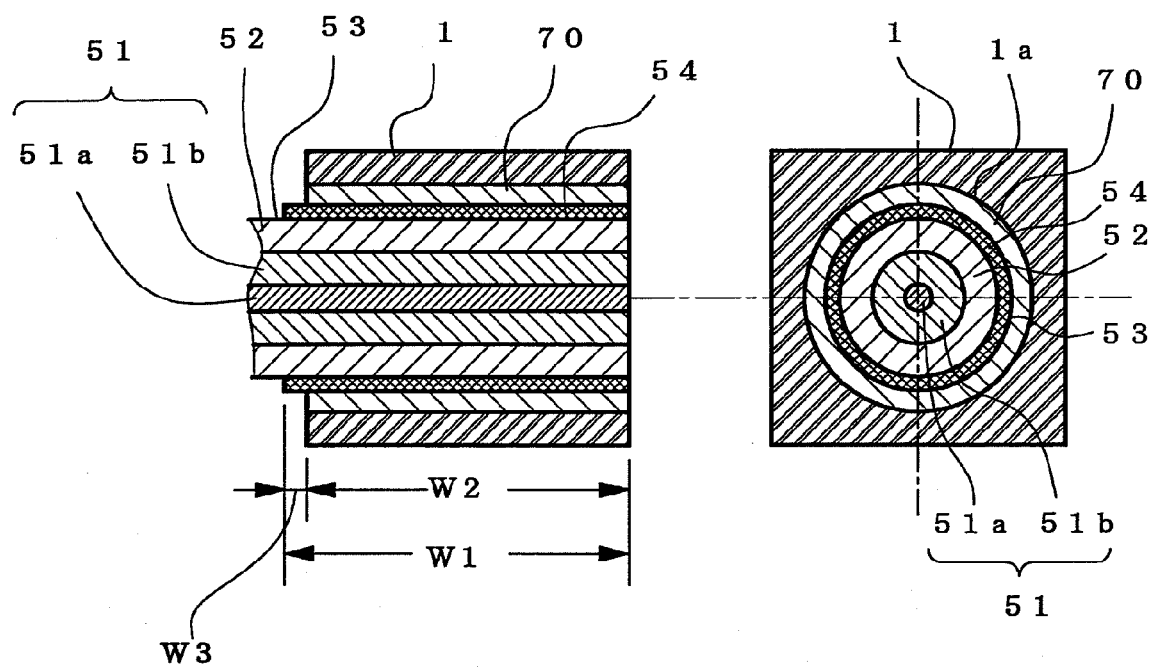
FIG. 1A shows a first embodiment of a fixing structure of a connector to an end of the optical fiber cable of the present invention, and is a schematic sectional view of the end of the optical fiber cable and the vicinity thereof in the direction of axis of the optical fiber cable.
FIG. 1B is a schematic sectional view of the end of the optical fiber cable in the direction orthogonal with the direction of axis of the optical fiber cable in the fixing structure of the first embodiment.
Figure 2:
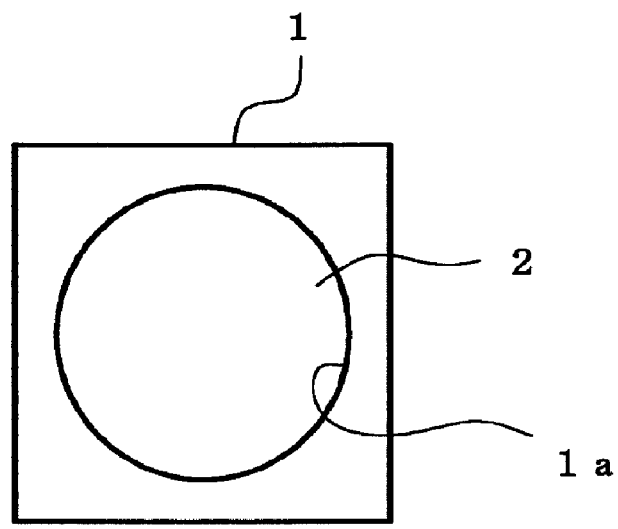
FIG. 2 is a schematic side view of a connector used in the fixing structure of the connector to the end of the optical fiber cable of FIG. 1.

FIG. 1 shows a first embodiment of a fixing structure of a connector to an end of the optical fiber cable of the present invention. FIG. 1A is a sectional view of the vicinity of the end of the optical fiber cable in the direction of axis of the optical fiber cable, and FIG. 1B is a sectional view of the end of the optical fiber cable in the direction orthogonal with the direction of axis of the optical fiber cable. FIG. 2 is a side view of a single connector.

In the first embodiment, a shielding layer 54 as a light shielding member is adhered to a resin coating layer 52 at the end of an optical fiber cable 53, and an inner surface 1a of an optical fiber cable insert throughpore (through-hole) 2 of a connector 1 is bonded with an adhesive layer 70 to the shielding layer 54, whereby the connector 1 is fixed to the end of the optical fiber cable 53.

Examples of the optical fiber cable 53 include an optical fiber cable used by incorporation into a fiber laser apparatus and the like (optical fiber cable for fiber laser apparatus), an optical fiber cable used for guiding a laser beam from a high power semiconductor laser to a desired part (optical fiber cable for energy transmission, optical fiber cable for delivery etc.), an optical fiber cable used for optical communication (optical fiber cable for optical communication) and the like. More specific examples include an optical fiber cable wherein a core 51a of a bare optical fiber 51 is made from germanium-doped silica, and a cladding 51b covering the core 51a is made from undoped silica, an optical fiber cable wherein a core 51a of a bare optical fiber 51 is made from silica doped with a rare earth element such as erbium (Er) and the like, and a cladding 51b covering the core 51a is made from undoped silica, an optical fiber cable wherein a core 51a of a bare optical fiber 51 is made from undoped silica, and a cladding 51b covering the core 51a is made from, for example, an acrylic resin and the like (i.e., polymer cladding optical fiber) and the like. The outer diameter of the bare optical fiber 51 is not particularly limited, and appropriately determined according to the use of the optical fiber and the like. It is generally 80-1000 μm.

It is important that the resin to be used for the cladding of a polymer cladding bare optical fiber generally has a low refractive index and superior transparency, and a resin further having mechanical strength after curing and flexibility and the like are advantageously used. Examples of the acrylic resin include copolymers of methylmethacrylate (MMA) with branched (meth)acrylate such as tert-butylmethacrylate and the like, alicyclic (meth)acrylate such as isobornylmethacrylate, norbornyl methacrylate, tricyclodecanyl (meth)acrylate and the like. In addition, those containing a fluorine atom in the structure unit are preferable from the aspects of low refractive index and low wavelength dependency of refractive index. Examples thereof include homopolymers such as fluorinated (meth)acrylate (e.g., polyhexafluoro isopropylmethacrylate, polyhexafluoro isopropylmethacrylate, poly2,2,3,3,4,4-hexafluoro butylmethacrylate and the like) and the like; and copolymers of methylmethacrylate (MMA) and fluorinated (meth)acrylate such as 2,2,2-trifluoro ethylmethacrylate (FMA), hexafluoroisopropylmethacrylate and the like. Furthermore, examples of those affording high mechanical strength after curing include fluorine atom-containing urethane (meth)acrylate compound, (meth)acrylate compound having fluorinated polyether in the structure, resin composition constituted with a photopolymerization initiator and the like. In addition, those described in JP-A-09-003386, JP-A-08-231743, JP-A-07-228820 and the like are also preferably used. Moreover, as acrylic resin, commercially available products can be directly used and, for example, "DEFENSA" (trade name) manufactured by DIC Co. and the like are preferably used.

The kind of the resin of the resin coating layer 52 that covers the outer circumference of the bare optical fiber 51 of the optical fiber cable 53 is appropriately determined according to the use of the optical fiber cable 53 and the function, material and the like of the bare optical fiber 51. For example, when the optical fiber cable 53 is used for fiber laser apparatuses and the bare optical fiber 51 has at least a silica core, an acrylic resin (e.g., urethane acrylate ultraviolet curing resin etc.), a fluororesin (e.g., tetrafluoroethylene resin etc.) and the like are use as resin coating layer 52 from the aspects of ensured mechanical strength of the bare optical fiber 51 (e.g., reduction of distortion of bare optical fiber 51 when it is bent). In addition, for example, when the optical fiber cable 53 is used for energy transmission and the core and cladding of the bare optical fiber 51 is made from silica, a fluororesin (e.g., tetrafluoroethylene resin etc.) and the like are preferably used as the resin coating layer 52 from the aspects of reliability during heat generation and the like.

The thickness of the coating layer 52 is not particularly limited, and it is appropriately set according to the constituent material and function (object) thereof. Generally, it is set to 30-100 μm.

The material of the shielding layer 54 is not particularly limited as long as it can be applied to the outer circumference of the optical fiber cable 53 and can block or attenuate the light leaked from the optical fiber cable 53. Any of metal materials, organic materials, inorganic materials and the like can also be used. A metal material is preferable in view of long-term stability, easiness of film formation and the like.

It is possible to block the light by increasing the thickness of the metal material. To decrease heat generation of a metal material by decreasing the light absorption by the metal material, a material having a high reflection to the wavelength of the light transmitted (propagated) by the optical fiber cable 53 is preferably selected as a metal material. As such metal material, for example, aluminum, gold, silver, platinum, copper, nickel and the like can be generally used. They may be any one kind or two or more kinds may be used in combination (i.e., a single film layer made from a single metal, a film made from a mixture of two or more kinds of metals (single film layer), multi-layer film of each layer made from a different metal). Particularly, when the optical fiber cable 53 is used for propagation of short wavelength light having a wavelength of 200-700 nm (particularly, visible light having a wavelength of about 460-530 nm), aluminum, gold, silver, platinum and the like are preferable as metal materials used for the shielding layer 54. Particularly, a thin film of aluminum, platinum and the like can achieve a reflection of not less than 95% to a short wavelength light having a wavelength of 400-700 nm. The "reflection" here is a value obtained by irradiating (incident) a light having a target wavelength to the object surface of a film to be measured, measuring the quantity of reflection light, and calculating the ratio of the quantity of incident light and the quantity of reflection light.

When the optical fiber cable 53 is used for propagation of a short wavelength light having a wavelength of 200-700 nm (particularly, visible light with wavelength of about 460-530 nm), the inorganic material is preferably a metal oxide such as alumina, zirconia and the like. Preferable examples of the organic material include organic pigments such as Perylene Black, Aniline Black and the like and resins containing them.

The shielding layer 54 is formed according to a method suitable for the material of a shielding layer from among known thin film formation methods. For example, when the shielding layer 54 is formed from a metal material, a vacuum vapor deposition method, a sputtering method, an electrolytic plating method, a nonelectrolytic plating method and the like are preferable.

When the shielding layer 54 is formed from an inorganic material, for example, a vacuum vapor deposition method, a sputtering method and the like can be employed.

When it is formed from a resin containing an organic pigment, for example, a method including applying a molten resin containing an organic pigment to the outer circumference of the optical fiber cable 53, and curing same can be employed.

It is necessary to ensure that the thickness and length of the shielding layer 54 are effective for blocking or attenuating the light leaking from the optical fiber cable 53. They are determined according to the material of the shielding layer, wavelength of the light to be shielded or attenuated and the like. The thickness is generally 10-10000 nm (10 nm-10 μm, particularly preferably, not less than 200 nm for the light having a wavelength of not less than 400 nm. When the thickness is less than 10 nm, sufficient blocking or attenuation of the light becomes difficult, and when the thickness exceeds 10000 nm (10 μm), the shielding layer 54 is unpreferably detached easily due to the inner stress.

Figure 6:
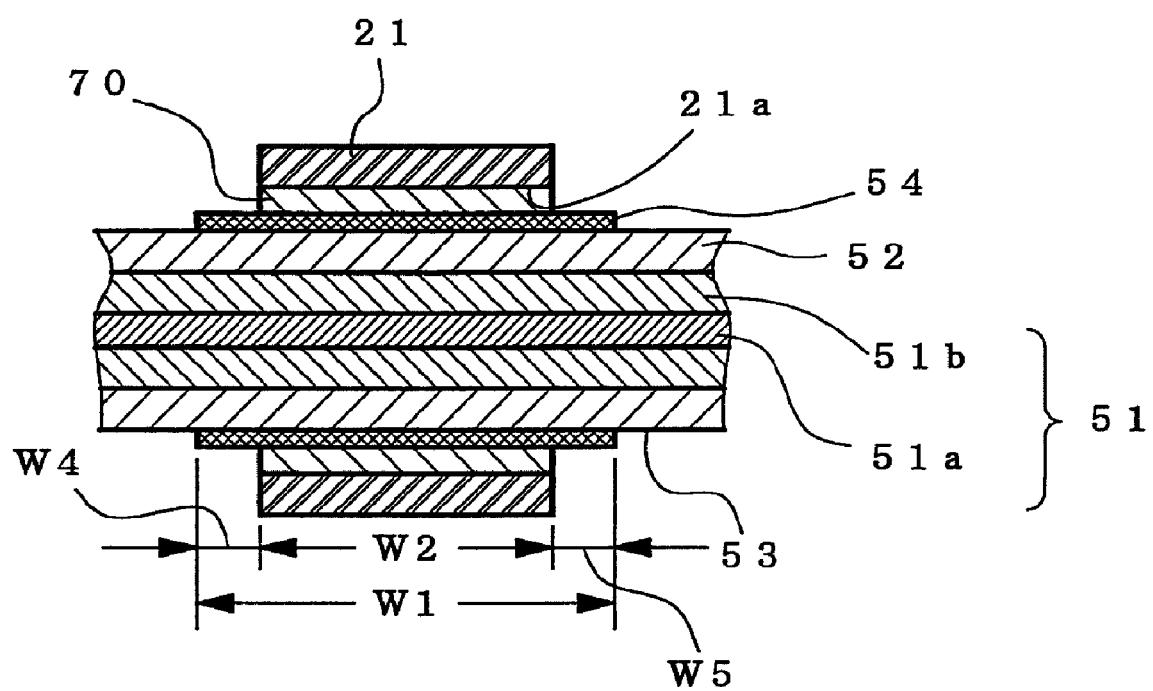
FIG. 6 is a schematic sectional view of the optical fiber cable in the direction of axis, which shows a fourth embodiment of a fixing structure of a holding member to an intermediate portion of the optical fiber cable of the present invention.

The length of the shielding layer 54 refers to the width (W1 in FIG. 1) of the shielding layer 54 in the direction of axis of the optical fiber cable 53. The width W1 needs to be larger than the width of a connector 1 as an exterior member (width in the direction of axis of the optical fiber cable 53: W2 in FIG. 1). A length that permits the shielding layer 54 to stick out by not less than 1 mm from at least one end portion of the connector 1 (end portion in the direction of axis of the optical fiber cable 53) is preferable. That is, W3 in FIG. 1 is preferably not less than 1 mm, more preferably not less than 10 mm. As shown in the below-mentioned fourth embodiment (FIG. 6), when a holding member 21 is fixed to the intermediate portion in the direction of axis of the optical fiber cable 53 rather than the end of the optical fiber cable 53, the shielding layer 54 is formed such that it sticks out by not less than 1 mm (preferably not less than 10 mm) from both end portions the exterior member (holding member 21). That is, W4, W5 in FIG. 6 are each preferably not less than 1 mm, more preferably not less than 10 mm. When excess length (W3, W4 or W5) is less than 1 mm, sufficient blocking or attenuation of the light leaking from the optical fiber cable 53 becomes difficult.

The excess length (W3, W4 or W5) of the shielding layer 54 only needs to be sufficient to effectively block or attenuate the light leaking from the optical fiber cable 53, and the upper limit is not particularly limited. When the excess length (W3, W4 or W5) is too long, workability decreases during formation of the shielding layer 54, the cost increases unnecessarily, and the shielding layer may be detached when the optical fiber cable is bent. Thus, the excess length (W3, W4 or W5) is generally not more than 100 mm, and the optical fiber cable is preferably not bent in the excess length part but maintained linear in the direction of axis.

Examples of the adhesive layer 70 to be placed between an inner surface 1*a* of a through-hole 2 of the connector 1 and the shielding layer 54 include organic adhesives such as epoxy resin type, acrylic resin type and the like, which have conventionally been used for bonding an exterior member such as a connector and the like to an optical fiber cable. While the thickness (dry thickness) of the adhesive layer 70 is not particularly limited, it is generally about 10-500 μm. When the thickness is less than 10 μm, sufficient adhesion force may not be afforded, and when it exceeds 500 μm, scars are tend to be produced during end surface polishing.

Figure 3:
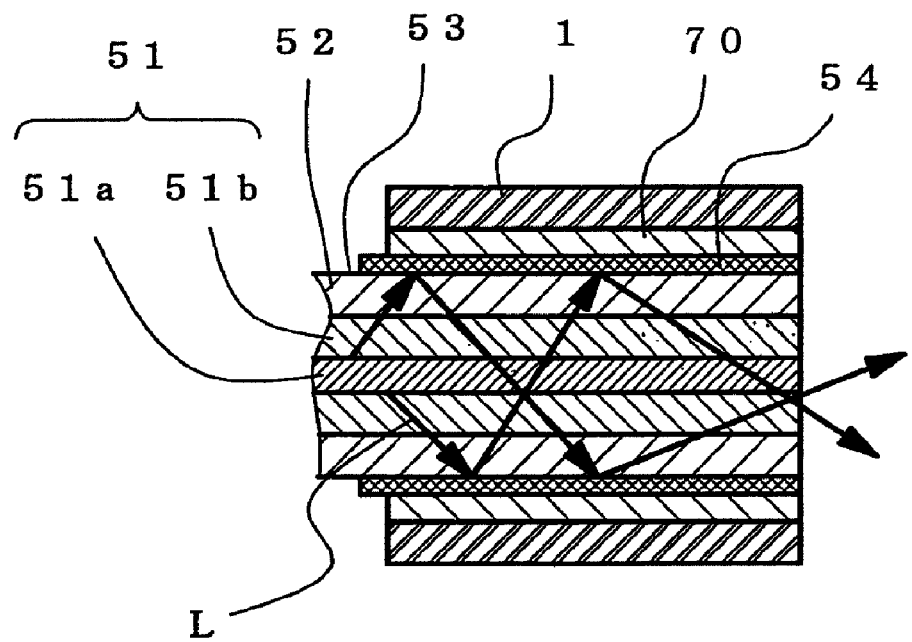
FIG. 3 is a schematic diagram wherein leakage of the light propagating in the optical fiber cable of FIG. 1 from the optical fiber cable is blocked by a shielding layer.

In the connector fixing structure of the first embodiment (FIG. 1), the shielding layer 54 having width (W1) somewhat larger than the width (W2) of the connector 1 in the direction of axis of the optical fiber cable 53 is formed on the part of the coating layer 52 of the optical fiber cable 53 where the connector 1 is externally mounted, and the connector 1 is bonded to the shielding layer 54. Therefore, the shielding layer 54 blocks or attenuates the light L leaking from the optical fiber cable 53, and can enclose the light in the optical fiber cable 53, as shown in FIG. 3. Accordingly, light absorption by the connector 1 and by an adhesive layer 70 used for bonding can be sufficiently reduced and heat generation at the bonding portion of the connector 1 can be prevented or even if heat generation should occur, the amount of heat generation can be sufficiently reduced. Moreover, since the shielding layer 54 is formed such that it corresponds to the connector 1 in the direction of axis of the optical fiber cable and sandwiched between the coating layer 52 of the optical fiber cable 53 and the connector 1, even when the optical fiber cable is bent, the shielding layer 54 is not detached easily, and the heat generation-preventive effect by the shielding layer 54 is maintained for a long time. Thus, even when the light is repeatedly propagated by the optical fiber, the development of inconveniences such as degradation of an optical fiber and an exterior member, uncoupling of the bond of the exterior member can be prevented.

Figure 4A:
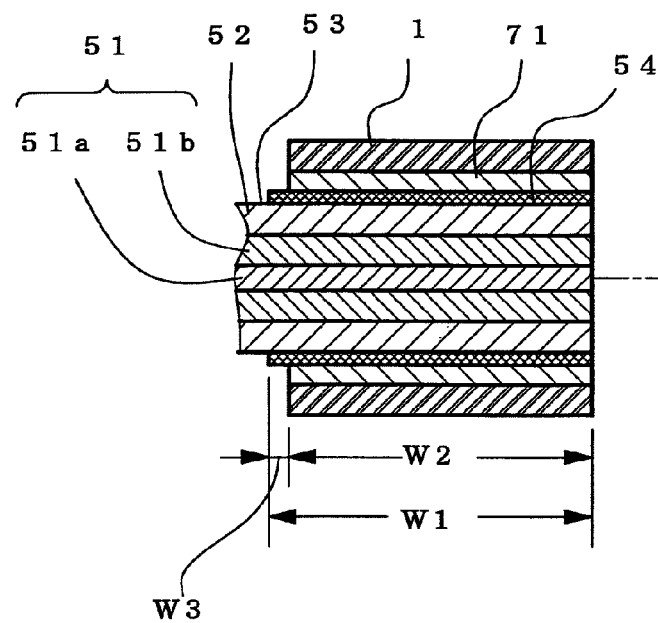
FIG. 4A shows a second embodiment of a fixing structure of a connector to an end of the optical fiber cable of the present invention, and is a schematic sectional view of the end of the optical fiber cable and the vicinity thereof in the direction of axis of the optical fiber cable.
Figure 4B:
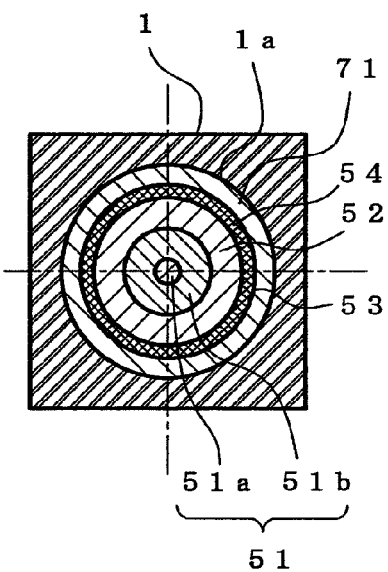
FIG. 4B is a schematic sectional view of the end of the optical fiber cable in the direction orthogonal with the direction of axis of the optical fiber cable in the fixing structure of the second embodiment.

FIG. 4 shows a second embodiment of a fixing structure of a connector to an end of the optical fiber cable of the present invention, FIG. 4A is a schematic sectional view of the end of the optical fiber cable and the vicinity thereof in the direction of axis of the optical fiber cable and FIG. 4B is a schematic sectional view of the end of the optical fiber cable in the direction orthogonal with the direction of axis of the optical fiber cable in the fixing structure of the second embodiment. In these Figures, the same symbols as in FIGS. 1, 2 show the same or corresponding parts.

In the connector fixing structure of this embodiment, an elastic member 71 is sandwiched and compressed between an inner surface 1a of an optical fiber cable insert hole 2 of the connector 1 and the shielding layer 54, whereby the connector 1 is bonded to the end portion of the optical fiber cable 53.

Here, the elastic member 71 is not particularly limited and any can be used as long as it has elasticity that permits being sandwiched and compressed between the connector 1 and the shielding layer 54 to fix them. As preferable elasticity value of the elastic member 71, Young' modulus and hardness (hardness D) thereof should be smaller than those of the above-mentioned organic adhesives such as epoxy resin type and the like, which have conventionally been used for bonding an exterior member such as a connector and the like to an optical fiber cable. In addition, the elastic member 71 itself does not need to have adhesiveness (presence of adhesiveness is preferable for more stable fixing structure). The Young' modulus is measured by the measurement method described in JIS K7113, and hardness D is measured by the measurement method described in JIS K7215. The Young' modulus of the epoxy resin type adhesive conventionally used for bonding an exterior member such as a connector and the like to an optical fiber cable exceeds 1000 MPa and the hardness (D) exceeds 85. For example, NO. 8774N manufactured by Kyoritsu Chemical & Co., Ltd. has Young' modulus of 3300 MPa and hardness (D) of 87, STYCAST2651MM manufactured by EMERSON&CUMING has Young' modulus of 4300 MPa and hardness (D) of 90, and XOC-03H2 manufactured by Kyoritsu Chemical & Co., Ltd. has Young' modulus of 2600 MPa and hardness (D) of 86.

Specific examples of the elastic member 71 include members made from silicone resin, synthetic rubber (e.g., butyl rubber, ethylene propylene rubber, urethane rubber, silicone rubber, chlorosulfonated polyethylene, chlorinated polyethylene, acrylic rubber, epichlorohydrin rubber, fluoro-rubber etc.) and the like. Specifically, for example, a silicone resin (XE14-D62 manufactured by GE Toshiba Silicone, Young' modulus: 7.4 MPa, hardness (D): 30) can be used.

The method of fixing the elastic member 71 is not particularly limited. For example, when the elastic member 71 is a material that expresses elasticity by curing like adhesives, a method including applying the material to the shielding layer 54 formed on the end portion of the outer circumference of the optical fiber cable 53, inserting the coated portion into an insert hole (through-hole) 2 of the connector 1, and drying and curing same can be employed. When the elastic member 71 is, for example, a cylindrically-formed product, a method including mounting the cylindrically-formed product on the shielding layer 54 formed on the outer circumference of the end portion of the optical fiber cable 53, and fixing the connector 1 to the outer circumference of the cylindrically-formed product and the like can be employed.

The thickness of the elastic member 71 is generally about 10-500 μm. The thickness here means the thickness as being sandwiched between the shielding layer 54 and the connector 1.

The above-mentioned adhesive layer 70 and elastic member 71 can contain a filler to improve thermal conductivity. When the adhesive layer 70 and the elastic member 71 have high thermal conductivity, heat radiation property is improved and preferable results can be obtained in terms of long-term reliability. The filler is not particularly limited and, for example, a metal having high thermal conductivity such as aluminum, gold, silver, copper, and any combination thereof can be used. The content of the filler is preferably 50-90 wt % of the adhesive layer 70 or elastic member 71 as a whole.

The constitution of this embodiment wherein the elastic member 71 is sandwiched between the shielding layer 54 on the outer circumference of the optical fiber cable 53 and an exterior member (connector 1 etc.) to fix the exterior member (connector 1) can reduce the stress applied to the optical fiber by fixing of the exterior member (connector 1). As a result, transmission loss at the end portion of the optical fiber can be reduced. Moreover, the stress applied to the shielding layer 54 by bending the optical fiber cable 53 can be reduced still more, and the detachment of the shielding layer 54 can be prevented at a higher level.

Figure 5A:
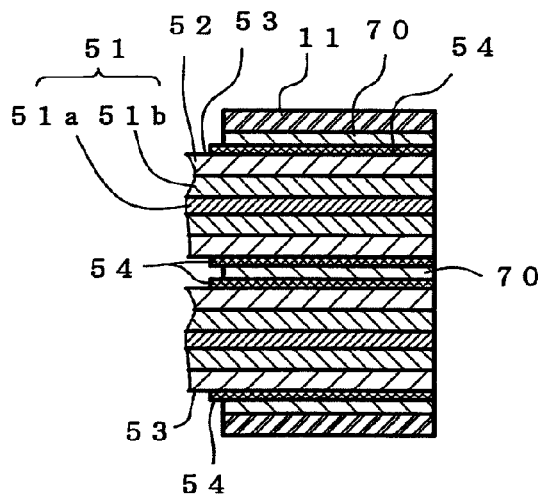
FIG. 5A shows a third embodiment of a fixing structure of a connector to an end of the optical fiber cable of the present invention, and is a schematic sectional view of the end of the optical fiber cable and the vicinity thereof in the direction of axis of the optical fiber cable.
Figure 5B:
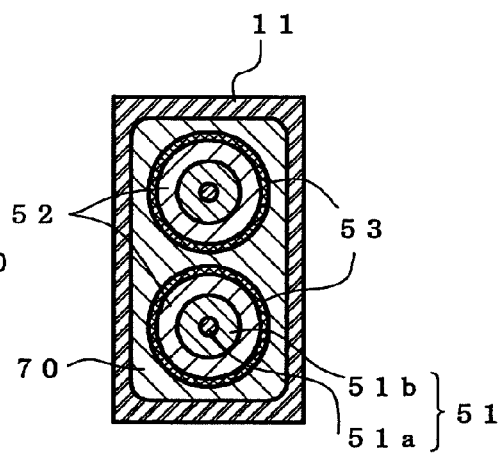
FIG. 5B is a schematic sectional view of the end of the optical fiber cable in the direction orthogonal with the direction of axis of the optical fiber cable in the fixing structure of the third embodiment.

FIG. 5 shows a third embodiment of a fixing structure of a connector to an end portion of the optical fiber cable of the present invention, FIG. 5A is a sectional view of the vicinity of the end portion of the optical fiber cable in the direction of axis of the optical fiber cable, and FIG. 5B is a sectional view of the end portion of the optical fiber cable in the direction orthogonal with the direction of axis of the optical fiber cable. In these Figures, the same symbols as in FIGS. 1, 2 show the same or corresponding parts.

The third embodiment has a connector fixing structure wherein one connector 11 is bonded to the end portions of two optical fiber cables 53, what is called a multi-fiber connector (bundle structure). As shown in the third embodiment, the present invention can also be applied to fixing of an exterior member to two or more plural optical fiber cables. While an adhesive layer 70 is used in the third embodiment, elastic member 71 may be used instead of the adhesive layer 70.

FIG. 6 is a sectional view of a fourth embodiment of a fixing structure of a holding member which is an exterior member to an intermediate portion in the direction of axis of the optical fiber cable of the present invention. In this Figure, the same symbols as in FIGS. 1, 2 show the same or corresponding parts.

In the fourth embodiment, a holding member 21 having a holding part 21a forming an optical fiber cable insert hole (through-hole) is mounted and fixed on an intermediate portion of the optical fiber cable 53 so as to hold and install the optical fiber cable 53 at a desired part in an apparatus or equipment.

As shown in the fourth embodiment, the present invention can be applied not only to fixing of an exterior member onto an end portion of the optical fiber cable but also fixing of an exterior member to the intermediate portion of the optical fiber cable. While an adhesive layer 70 is used in this embodiment, elastic member 71 may be used instead of the adhesive layer 70.

FIGS. 7A-FIG. 7D show formation steps of a fifth embodiment of a fixing structure of a connector to the end portion of the optical fiber cable of the present invention. In the fifth embodiment, the connector fixing structure contains a light-shielding pipe as the light shielding member.

Figure 7A:
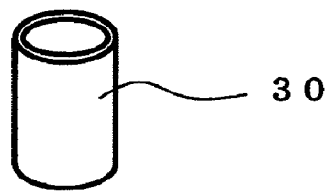
FIGS. 7A-FIG. 7D are views by steps showing a formation method of a fifth embodiment of a fixing structure of a connector to the end of the optical fiber cable of the present invention.
Figure 7B:
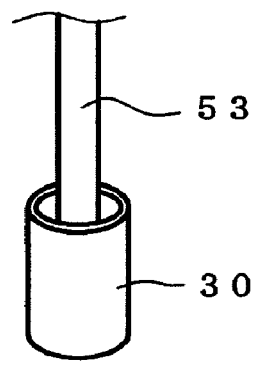
Figure 7C:
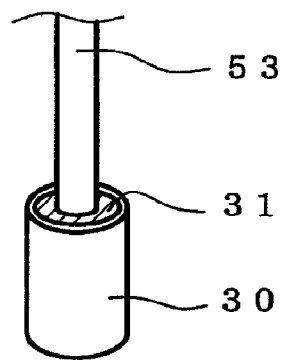
Figure 7D:
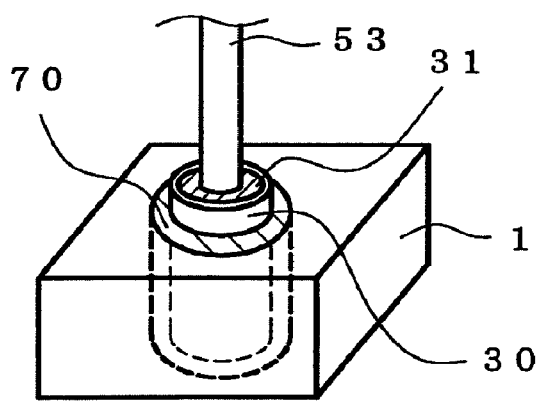

First, a light-shielding pipe 30 (FIG. 7A) is prepared from a material that shuts off or attenuates the light leaking from the optical fiber cable 53. For example, a pipe-shaped processed product is obtained by processing a metal block of aluminum, copper and the like by cutting, grinding and the like, or prepared by casting a metal such as aluminum, copper, silver and the like. In addition, the light-shielding pipe 30 may be prepared as a pipe-shaped ceramic molded product by sintering metal oxide such as alumina, zirconia and the like. From the aspect of easy processability, a metal pipe is preferable. Then, the end portion of the optical fiber cable 53 is inserted into the light-shielding pipe 30 (FIG. 7B), a resin 31 is filled between the light-shielding pipe 30 and the optical fiber cable 53, whereby the light-shielding pipe 30 is fixed on the end portion of the optical fiber cable 53 (FIG. 7C). Then, the light-shielding pipe 30 bonded to the end portion of the optical fiber cable 53 is inserted into the connector 1, and an organic adhesive such as epoxy resin type, acrylic resin type and the like is poured into the clearance to bond the inner surface of the connector 1 to the light-shielding pipe 30 via the adhesive layer 70 (FIG. 7D). The aforementioned elastic member 71 may be used instead of the adhesive layer 70.

While the thickness of the light-shielding pipe 30 varies depending on the material thereof, it is generally about 0.1-1 mm. When it is less than 0.1 mm, the yield of pipe preparation unpreferably decreases and when it exceeds 1 mm, the fixing structure unpreferably becomes large and heavy. The inner diameter of the light-shielding pipe 30 has such a size that enables smooth insertion of the end portion of the optical fiber cable 53, which is generally about 100-1000 μm greater than the outer diameter (diameter) of the optical fiber cable. In addition, the length of the light-shielding pipe 30 (width in the direction of axis) corresponds to the width of the aforementioned shielding layer 54 (W1 in FIG. 1) and the size of W1 directly corresponds thereto. The light-shielding pipe 30 is bonded to an exterior member such as a connector and the like such that the aforementioned excess length (W3, W4, W5) can be formed from the exterior member.

The resin 31 to be filled between the light-shielding pipe 30 and the optical fiber cable 53 is not particularly limited as long as it can absorb light and does not generate heat easily. For example, a resin for a resin coating layer in the aforementioned optical fiber cable and a resin for cladding in polymer cladding optical fiber can be used. Particularly, using the same resin as the resin of the resin coating layer of the optical fiber cable 53, the bond between the light-shielding pipe 30 and the optical fiber cable 53 is not easily uncoupled due to temperature changes, whereby a shading structure having higher reliability to temperature changes can be formed. When the optical fiber cable 53 is a polymer cladding optical fiber cable (optical fiber cable wherein cladding of bare optical fiber is a resin), heat generation due to light absorption can be more effectively suppressed by the use of the same resin as the resin of the cladding of the bare optical fiber.

When a holding member 21 is fixed on an intermediate portion of the optical fiber cable shown in the aforementioned FIG. 6, a fixing structure using a similar the light-shielding pipe 30 as in the fourth embodiment can be formed. When a multi-fiber connector (bundle structure) shown in the aforementioned FIG. 5 is formed, a constitution using a light-shielding pipe 30 similar to that in this embodiment can be employed.

While the shape and size of the exterior member to be mounted on the optical fiber cable is not particularly limited in the present invention, connectors 1, 11 and holding member 21, which are examples thereof, may have a cross sectional outer shape of quadrate as shown in FIG. 1, circular shape, ellipse etc. While the size thereof is appropriately determined according to the outer diameter and the like of the optical fiber cable, the thickness of the wall surrounding the optical fiber cable is preferably not less than 0.5 mm. While the length of the connectors 1, 11 and holding member 21 in the direction of axis of the optical fiber cable (W2 in FIG. 1A and FIG. 6) is not particularly limited, it is generally 5-50 mm. As the materials of the connector 1, 11, holding member 21 and the like, for example, metal such as stainless steel (e.g., SUS316L and the like), aluminum, aluminum alloy and the like, plastic such as phenol resin, epoxy resin, acrylic resin and the like, ceramic material such as zirconia and the like, and the like can be used.

While connectors and holding members made of epoxy resins and acrylic resins are preferable in terms of processability, productivity and the like and have been widely used, they exhibit particularly remarkable operation and effect by applying the present invention since they easily generate heat by absorption of light having a short wavelength of 200-700 nm.

The present invention is explained in more detail in the following by referring to Examples, which are not to be construed as limitative.

Example 1

A polymer cladding bare optical fiber (full-length of several hundred meters or longer) wherein 30 μm-thick cladding made of an acrylic resin ("DEFENSA" (trade name) manufactured by DIC Co.) was formed on the outer circumference of a core (core diameter: 400 μm made from undoped silica was prepared, and a 50 μm-thick resin coating layer made from an acrylic resin ("DeSolite" (trade name) manufactured by JSR) was formed on the outer circumference thereof to give a polymer cladding optical fiber cable having an outer diameter (diameter) of 560 μm.

The optical fiber cable was cut into an optical fiber cable having a full-length of 2 m, and a shielding layer (thickness: 200 nm, reflection rate 90%) made of aluminum was formed by a vacuum vapor deposition method for a length of 50 mm from the end of the fiber on each of the both ends in the direction of axis of the optical fiber cable. That is, a shielding layer of FIG. 1 having W1 of 50 mm was formed.

A quasi-rectangular parallel-piped aluminum connector (length (W2 in FIG. 1) 30 mm) having a quadrate cross sectional outer shape of length 5 mm×width 5 mm, which has a through-hole (diameter 1 mm) having a round cross sectional shape formed at about center of the quadrate cross sectional outer shape and in the length direction thereof was prepared. An epoxy resin adhesive (Konishi Co., Ltd., trade name: Quick 5) was applied to the inner surface of the through-hole of the connector, and connectors were mounted on both end portions of the above-mentioned optical fiber cable such that one end surface in the length direction of the connector is positioned at the end of the fiber. The fiber was dried at room temperature for about 60 min to cure the epoxy resin adhesive, whereby a fixing structure of a connector as shown in FIG. 1 was formed, wherein the inner surface of the through-hole of the connector was bonded via the adhesive layer (thickness: 220 μm) to the shielding layer of each end portion. The excess length (W3) of the shielding layer from the end surface of the connector in FIG. 1 was 20 mm.

<Verification of Effect>

(Temperature Rise)

A visible laser beam (wavelength: 450 nm) was incidented into an optical fiber cable having connectors fixed to the both end portions mentioned above for 6 hr. The fiber coupled power was set to 4 W, and the temperature change of the connector before and after incidence of the laser beam was measured. As a result, the temperature change was +2° C., and the temperature rise was extremely small.

(Delamination Resistance of Shielding Layer)

A bending test including fixing an end portion of an optical fiber with a connector bonded thereto, and bending the rest of the fiber 90° to the right and left at 100 bending reciprocations/second was performed. The presence or absence of delamination of the shielding layer was confirmed. As a result, delamination was not confirmed.

Example 2

In the same manner as in Example 1, a polymer cladding bare optical fiber (full-length of several hundred meters or longer) wherein 30 μm-thick cladding made of an acrylic resin ("DEFENSA" (trade name) manufactured by DIC Co.) was formed on the outer circumference of a core (core diameter: 400 μm) made from undoped silica was prepared, and a 50 μm-thick resin coating layer made from an acrylic resin ("DeSolite" (trade name) manufactured by JSR) was formed on the outer circumference thereof to give a polymer cladding optical fiber cable having an outer diameter (diameter) of 560 μm. The optical fiber cable was cut into an optical fiber cable having a full-length of 2 m, and a shielding layer (thickness: 200 nm, reflection rate 90%) made of aluminum was formed by a vacuum vapor deposition method for a length of 50 mm from the end of the fiber on each of the both end portions in the direction of axis of the optical fiber cable.

Then, a cylindrical member (thickness: 215 μm, inner diameter: 0.6 mm, length (width in the direction of axis): 40 mm) prepared from a silicone resin (XE14-D62 manufactured by GE Toshiba Silicone, Young' modulus: 7.4 MPa, hardness (D): 30) was mounted on the shielding layer of the above-mentioned optical fiber cable, a connector was fixed to the cylindrical member to give an optical fiber cable having connectors fixed to the both end portions. A visible laser beam was incidented into the optical fiber cable with the connectors under the conditions similar to those mentioned above. The temperature change before and after incidence of the laser beam was +2° C., and the temperature rise was extremely small. In the same manner as the above, a delamination-resistance test of the shielding layer was performed. As a result, delamination of the shielding layer was not confirmed.

Example 3

As a light-shielding pipe, a stainless pipe (inner diameter 700 μm, thickness 100 μm, outer diameter 900 μm) was prepared, an end portion of a polymer cladding the optical fiber cable (outer diameter 560 μm), which is the same as the polymer cladding optical fiber cable used in Example 1, was inserted into the stainless steel pipe, and the same acrylic resin ("DEFENSA" (trade name) manufactured by DIC Co.) as the cladding of the polymer cladding optical fiber cable was filled in a clearance between the light-shielding pipe and the fiber cable to give an optical fiber with a light-shielding pipe. Then, an end portion of the above-mentioned optical fiber with a light-shielding pipe (end portion where light-shielding pipe was bonded) was inserted into a through-hole of the same aluminum connector as used in Example 1 and the aluminum connector was fixed with an epoxy resin adhesive (manufactured by Konishi Co., Ltd., trade name: Quick 5). The excess length of the stainless steel pipe from the end surface of the connector was 20 mm. The thus-obtained optical fiber with a connector was subjected to a visible laser beam incidence test as in Example 1. As a result, the temperature change was about +3° C., and the temperature rise was extremely small.

Example 4

In the same manner as in Example 3 except that the same acrylic resin ("DeSolite" (trade name) manufactured by JSR) as the resin coating layer of the polymer cladding optical fiber cable was used as the resin to be filled in a clearance between the light-shielding pipe and the fiber, an optical fiber with a connector was prepared, and the obtained optical fiber was subjected to a visible laser beam incidence test as in Example 1. As a result, the temperature change was extremely small as in Example 3.

Comparative Example 1

An optical fiber cable with a connector fixed on an end portion thereof was prepared in the same manner as in Example 1 except that a shielding layer was not formed on the optical fiber cable, and subjected to a test as in Example 1. As a result, a temperature increase of about several dozen ° C. (about 40° C.) before and after incidence of the laser beam was confirmed.

Since the optical fiber coating structure of the present invention can prevent heat generation in an exterior member-bonding portion of an optical fiber in various apparatuses, equipment and the like utilizing an optical fiber in the fields of communication and measurement, it can prevent degradation of an optical fiber and can suppress undesirable displacement of an optical fiber from a predetermined position in an apparatus or equipment, and an undesirable temperature rise in an apparatus or equipment.

This application is based on a patent application No. 2008-186361 filed in Japan, the contents of which are incorporated in full herein by this reference.

What is claimed is:

1. A fixing structure of an exterior member to an optical fiber cable comprising:
an exterior member including a light shielding member; and
an optical fiber cable including a bare optical fiber and a resin coating formed on an outer circumference of the bare optical fiber,
wherein the exterior member has a through-hole through which the optical fiber cable is inserted,
wherein the light shielding member covers an outer circumference of the optical fiber cable,
wherein the light shielding member is fixed at a part where the exterior member is externally mounted, and an inner surface of the through-hole of the exterior member is bonded to the light shielding member,
wherein the light shielding member is a light-shielding pipe, and a resin which is the same as the resin coating layer of the optical fiber cable is filled between the light-shielding pipe and the optical fiber cable,
wherein the exterior member includes a connector disposed radially outwardly of the light-shielding pipe, and wherein a length of the light-shielding pipe in a longitudinal direction of the optical fiber cable extends from an end of the connector by a distance of at least 1 mm and not more than 100 mm.

2. The fixing structure of claim 1, wherein the light shielding member is a shielding layer formed on the resin coating layer of the optical fiber cable.

3. The fixing structure of claim 1, wherein the inner surface of the through-hole is bonded to the light shielding member with an adhesive layer.

4. The fixing structure of claim 1, wherein the inner surface of the through-hole is bonded to the light shielding member with an elastic member.

5. The fixing structure of claim 1, wherein the exterior member is a connector fixed on an end of the optical fiber cable.

6. The fixing structure of claim 1, wherein the optical fiber cable propagates a short wavelength light having a wavelength of 200-700 nm, and the light shielding member is made from a metal.

7. The fixing structure of claim 6, wherein the light shielding member is made from one or more metals selected from the group consisting of aluminum, gold, silver and platinum.

8. The fixing structure of claim 1, wherein the resin filled between the light-shielding pipe and the optical fiber cable contacts the outer circumference of the optical fiber cable and the inner circumference of the light-shielding pipe.

9. The fixing structure of claim 1, wherein the resin filled between the light-shielding pipe and the optical fiber cable contacts the outer circumference of the optical fiber cable and the inner circumference of the light-shielding pipe over an entire extent of the light-shielding pipe in a longitudinal direction of the light-shielding pipe.

10. The fixing structure of claim 1, wherein the length of the light-shielding pipe in a longitudinal direction of the optical fiber cable extends from the end of the connector by a distance of at least 10 mm.

11. The fixing structure of claim 1, wherein the resin filled between the light-shielding pipe and the optical fiber cable is in contact with an entirety of an inner peripheral surface of the light shielding member.

12. A fixing structure of an exterior member to an optical fiber cable comprising:
    an exterior member including a light shielding member; and
    an optical fiber cable including a bare optical fiber and a resin coating formed on an outer circumference of the bare optical fiber,
    wherein the exterior member has a through-hole through which the optical fiber cable is inserted,
    wherein the light shielding member covers an outer circumference of the optical fiber cable,
    wherein the light shielding member is fixed at a part where the exterior member is externally mounted, and an inner surface of the through-hole of the exterior member is bonded to the light shielding member,
    wherein the bare optical fiber is a polymer cladding fiber, the light shielding member is a light-shielding pipe, and a resin which is the same as the resin coating layer of the optical fiber cable is disposed between the light-shielding pipe and the optical fiber cable,
    wherein the exterior member includes a connector disposed radially outwardly of the light-shielding pipe, and
    wherein a length of the light-shielding pipe in a longitudinal direction of the optical fiber cable extends from an end of the connector by a distance of at least 1 mm and not more than 100 mm.

13. The fixing structure of claim 12, wherein the resin filled between the light-shielding pipe and the optical fiber cable contacts the outer circumference of the optical fiber cable and the inner circumference of the light-shielding pipe.

14. The fixing structure of claim 12, wherein the resin filled between the light-shielding pipe and the optical fiber cable contacts the outer circumference of the optical fiber cable and the inner circumference of the light-shielding pipe over an entire extent of the light-shielding pipe in a longitudinal direction of the light-shielding pipe.

15. The fixing structure of claim 12, wherein the length of the light-shielding pipe in a longitudinal direction of the optical fiber cable extends from the end of the connector by a distance of at least 10 mm.

16. The fixing structure of claim 12, wherein the resin filled between the light-shielding pipe and the optical fiber cable is in contact with an entirety of an inner peripheral surface of the light shielding member.

\* \* \* \* \*